United States Patent [19]
Gardea-Torresdey et al.

[11] Patent Number: 5,927,005
[45] Date of Patent: Jul. 27, 1999

[54] PHYTOREMEDIATION OF HEAVY METALS WITH CREOSOTE PLANTS

[75] Inventors: Jorge Gardea-Torresdey; Kirk Tiemann; Lori Polette; Russ Chianelli; Nicholas Pingitore; William Mackay, all of El Paso, Tex.

[73] Assignee: Board of Regents, The University of Texas, Austin, Tex.

[21] Appl. No.: 08/827,623

[22] Filed: Apr. 9, 1997

[51] Int. Cl.$^6$ .................................................... A01B 79/00
[52] U.S. Cl. ................................. 47/58.1; 75/330; 75/711; 210/602; 435/430
[58] Field of Search ............................ 47/58.1; 435/430; 75/711, 330; 210/602

[56] References Cited

U.S. PATENT DOCUMENTS 5,364,451  11/1994  Raskin et al. .
5,785,735   7/1998  Raskin et al. .

OTHER PUBLICATIONS

Brandvold et al. Env. Geochem & Health. vol. 18(1). (abstract enclosed), 1996.
Adler, "Botanical Cleanup Crews: Using Plants to Tackle Polluted Water and Soil," Science News, 150:42–43, 1996.
Bache et al., "Concentrations of Metals in Grasses in the Vicinity of a Municipal Refuse Incinerator," Arch. Environ. Contam. Toxicol., 20:538–542, 1991.
Baker et al., "Heavy Metal Accumulation and Tolerance in British Populations of the Metallophyte Thlaspi caerulescens J. & C. Presl (Brassicaceae)," New Phytol., 127:61–68, 1994.
Brown, "The Green Clean: The Emerging Field of Phytoremediation Takes Root," BioScience, 45(9):579–582, 1995.
Brown, Chaney, Angle and Baker, "Phytoremediation Pential of Thlaspi caerulescens and Bladder Campion for Zinc– and Cadmium–Contaminated Soil," J. Environ Qual., 23:1151–1157, 1994.
"Zygophyllaceae: Caltrop Family: Creoste Bush: Larrea Tridentata," Climate Zones, pp. 85–86.
Drake and Rayson, "Plant–Derived Materials for Metal Ion–Selective Binding and Preconcentration," Analytical Chemistry News & Features, Jan. 1, 1996, 22–27.
Dushenkov et al., "Rhizofiltration: The Use of Plants to Remove Heavy Metals from Aqueous Streams," Environ. Sci. Technol., 29(5):1239–1245, 1995.
Gardea–Torresdey, Arteaga, Tiemann, Bibb and Gonzales, "Determination of the Content of Hazardous Heavy Metals in Larrea tridentata (Creosote Bush) Found Naturally Growing in Contaminated Soils," HSRC/WERC Joint Conference on the Environment Abstracts, 1996, p. 93.
Kumar et al., "Phytoextraction: The Use of Plants to Remove Heavy Metals from Soils," Environ. Sci. Technol., 29(5):1232–1238, 1995.
Moffat, "Plants Proving Their Worth in Toxic Metal Cleanup," Science, 261:302–303, 1995.
Powell, "Metal Detectors," Scientific American, Aug. 1995, 36–37.
Schnoor et al., "Phytoremediation of Organic and Nutrient Contaminants," Envirn. Sci. Technol., 29(7):318–323, 1995.
Banuelos and Meek, "Accumulation of Selenium in Plants Grown on Selenium–Treated Soil," J. Environ. Qual., 19:772–777, 1990.
Brooks, Trow, Veillon and Jaffre, "Studies on Manganese–Accumulating Alyxia Species from New Caledonia," Taxon, 30(2):420–423, May, 1981.
Brooks, Morrison, Reeves, and Malaisse, Copper and cobalt in african Species of Aeolanthus Mart. (Plectranthinae, Labiatae) Plant and Soil, 50:503–507.
Brooks, Morrison, Reeves, Dudley, and Akman, Proc. R. Soc. London Ser. B, 203:387–403, 1979.
Chaney, in Land Treatment of Hazardous Wastes: Parr and Marsh, Eds.; Noyes Data Corp., Park Ridge, New Jersey, U.S.A., 1983; pp. 50–76.
Cooney, "Sunflowers Remove Radionuclides from Water in Ongoing Phytoremediation Field Tests," News Technology, 30(5):194, 1996.
Cunningham and Berti, "Remediation of Contaminated soils with Green Plants: An Overview," In Vitro Cell Dev. Biol. 29P:207–212, 1993.
Gardea–Torresday et al., "Ability of Silica–Immobilized Medicago sativa (Alfalfa) to Remove Copper Ions from Solution," J. Hazardous Materials, 48:181–190, 1996.
Kabata–Pendias and Pendias, Trace elements in soils and plants, CRC Press, Boca Raton, Florida, 1989.
Klessa, D.A., A. Desira–Buttigieg. "The Adhesion to Leaf Surfaces of Heavy Metals from Sewage Sludge Applied to Grassland," Soil Use and Management, 8(3):115–121, 1992.
Koeppe, In Effect of Heavy Metal Pollution on Plants, Lepp, Ed., Applied Science Publishers: London, 1981, pp. 55–76.
Lee et al., "Fate of Benzo(a)pyrene in the Rhizosphere of Festuca arundinacea," Proceedings of the 10th Annual Conference on Hazardous Waste Research. (1995), 207.
Malone, Koeppe, Miller, "Localization of Lead Accumulated by Corn Plants," J. Plant Physiol., 53:388–394, 1974.
Narayanan et al., "Fate of Volatile Chlorinated Organic Compounds in a Laboratory Chamber with Alfalfa Plants," Environ. Sci. Technol., 29(9):2437–2444, 1995.
Narwal et al., "Effect of Nickel Enriched Sewage Water on the Accumulation of Nickel and Other Heavy Metals in Corn," J. Indian Soc. Soil Sci., 39:123–128, 1991.

(List continued on next page.)

Primary Examiner—Leon B. Lankford, Jr.
Attorney, Agent, or Firm—Arnold White &Durkee

[57] ABSTRACT

Methods are described for the decontamination of soil containing heavy metals. In particular, these methods rely on phytoremediation using the plants of the species Larrea tridentata, the creosote bush. The methods are particularly directed at the decontamination of soil containing lead, copper, nickel and cadmium. The methods described herein are the first examples of phytoremediation using perennial plants which concentrate a high proportion of the scavenged metals in nonessential tissues, allowing the plants to be used continuously, rather than requiring repeated cycles of planting and harvesting entire plants in order to fully decontaminate the same area of land.

42 Claims, No Drawings

OTHER PUBLICATIONS

Reeves and Brooks, "Hyperaccumulation of Lead and Zinc by Two Metallophytes from Mining Areas of Central Europe," *Environ. Pollut. Ser A,* 31:277–285, 1983.

Vojtechova and Leblova, "Uptake of Lead and Cadmium by Maize Seedings and the Effect of Heavy Metals on the Activity of Phasphoenolpyruvate Carboxylase Isolated from Maize," Biologia Plantarum (PRAHA). 33(5):386–394, 1991.

Wenzel, Sattler, and Jockwer, *Agronomy Abstracts;* American Society of Agronomy: Madison, 1993, p. 52.

Raskin, et al., "Bioconcentration of Heavy Metals By Plants," *Current Opinion in Biotechnology,* 5:285–290, 1994.

Baker, Brooks and Reeves, "Heavy Metals Are Poisonous to Most Plants. Those Specialised Species That Thrive on Metal–Rich Soils Are Leading Geologists to Ores, Archaeologists to Ancient Settlements and Plant Scientists Towards New Biochemical Pathways," *New Sci.,* 1603:44–48, 1989.

Baker, McGrath, Sidoli and Reeves, "The Possibility of In Situ Heavy Metal Decontamination of Polluted Soils Using Crops of Metal–Accumulating Plants," *Resour. Conserv. Recycl.,* 11:41–49, 1994.

MacMahon, "Deserts," In The Audubon Society Nature Guides, published by Alfred A. Knopf, Inc., New York, 1992, p. 499.

United States EPA, Test Methods for the Evaluation of Solid Wastes, Method 3050, Acid Digestion of Sediments, Sludges and Soils, Revision 1, Dec. 1987.

PHYTOREMEDIATION OF HEAVY METALS WITH CREOSOTE PLANTS

The government owns rights in the present invention pursuant to grant number GM 08012-25 from the National Institutes of Health.

BACKGROUND OF THE INVENTION

1. Field of the Invention

The present invention relates generally to the field of phytoremediation. More particularly, the invention relates to methods of removing and possibly recovering a variety of contaminants such as, for example, metals, including heavy metals from soil using creosote (*Larrea tridentata*) plants.

2. Description of Related Art

Numerous ecological and health problems are associated with environmental contamination. Heavy metal contamination of soil is a particular hazard, due to the almost indefinite environmental persistence of metals, as well as the universal toxicity of high concentrations of many heavy metals in living organisms. The term "heavy metals" as used herein, means any metal having a molecular weight greater than sodium. Additionally, sometimes various elements such as selenium and arsenic are considered to be in this category. While some heavy metals are naturally present in soil, heavy metal contamination is also often the result of human activities. For example, mining, smelting, intensive agriculture, sludge dumping, energy and fuel production, electroplating and fuel exhaust all contribute to contaminating the soil with heavy metals. Currently, the most common methods for dealing with this problem remain removal and burial of the contaminated soil or the isolation of the contaminated area. Removal and burial is extremely expensive. Between 1995 and 1999 the United States is expected to spend seven billion dollars cleaning up sites contaminated with heavy metals alone and another thirty-five billion dollars cleaning up sites contaminated with both metals and additional organic contaminants (Brown). Cleaning up a single acre of contaminated land can cost as much as one million dollars (Powell).

One relatively new option for decontaminating soil is phytoremediation or phytoextraction, the use of plants to scavenge organic or inorganic contaminants from the soil (Baker et al., 1989, 1994; Chaney; Cunningham and Berti; Raskin et al, 1994; Wenzel et al). While most plants are unable to grow in soil containing high levels of heavy metals, a few species appear to be able to absorb the metals, adapt to them and thrive. Such plants are sometimes called hyperaccumulators or metallophytes.

Certain plants have been found that accumulate nickel (Brooks et al., 1979), cobalt and copper (Brooks et al, 1978), manganese (Brooks et al., 1981), lead and zinc (Reeves and Brooks,), zinc and cadmium (Brown et al., 1994), and selenium (Banuelos and Meek). Accumulators of nickel are by far the most common amongst the hyperaccumulators discovered to date. Of the 400 known phytoremediator plants known in 1995, 300 absorb nickel, while about 26 assimilate cobalt, 20 take up copper and another 20 incorporate zinc (Brown). The more rarely absorbed heavy metals include manganese, cadmium and lead, with lead being particularly hard to absorb, as well as being very difficult to translocate from plant roots into plant stems after it is absorbed (Kabata-Pendias and Pendias; Reeves and Brooks; Malone et al.; Zimdahl and Koeppe; and Koeppe). One recently reported lead accumulator is *Brassica juncea*, the Indian mustard plant (Kumar et al., 1995). Some cultivars of this species are particularly efficient at translocating lead into their stems, although lead levels in the leaves was still low, 11% to 5.6% of the amount found in the stems.

Despite ever increasing interest and research in the field, several problems associated with phytoremediation remain (Brown). For example, some metals in contaminated areas may be unreachable via phytoremediation because they lie beneath the plant root zone. Many metal-accumulating plants are unable to translocate a substantial proportion of the metal they acquire from their roots to other tissues, and many of the known metal-accumulating plants are simply too small to accumulate large quantities of metal. Additionally, many of the plants thus far identified as useful in phytoremediation are from tropical regions (Moffat). For the future usefulness of phytoremediation, plants are needed that can grow in a variety of climates, from deserts to the coldest locations with human activity.

SUMMARY OF THE INVENTION

The present invention succeeds in overcoming these and other drawbacks in the prior methods by providing a inexpensive, effective and novel method for decontaminating soil containing heavy metals. The present invention is derived from the inventors' finding that plants of the species *Larrea tridentata*, commonly known as the creosote bush, growing in metal-contaminated soil, sequester heavy metals such as lead, copper, cadmium, nickel, strontium, zinc, arsenic and selenium in their leaves, stems and roots. Of particular note is that, unlike many plants currently being used in the phytoremediation of metals, a substantial proportion of the sequestered metal was found in the leaf and stem tissues of the creosote bush. Moreover, the plants were particularly proficient at assimilating copper, one of the more valuable metal contaminants, and lead, a metal that is especially hard for plants to absorb. Additionally, the creosote bush readily grows in desert or semidesert conditions common to this country and to much of the world.

In one aspect of the present invention, methods are described involving the use of creosote bushes in the extraction of heavy metals from soil. The preferred embodiments of this aspect of the invention involve the extraction of lead, copper, cadmium and nickel from the soil, with methods for the extraction of lead and copper being the most preferred. As part of these methods, the entire creosote bush might be removed after it is allowed to grow in metal-containing soil, incorporating those metals into its tissues. However, in many of the preferred embodiments, the practitioner of the present invention can take advantage of the perennial nature of the creosote bush along with its ability to sequester substantial proportions of its accumulated metal in stem and leaf tissue.

In these preferred embodiments, the bushes are planted in contaminated soil and allowed to grow and scavenge metals from the soil. Then, at appropriate time intervals, the metal-containing leaves and possibly branches are removed from the plant, allowing the remaining plant tissues to survive. In one preferred embodiment of the invention, the leaves or the leaves and some of the stems are collected annually. As part of all of these embodiments, the collected plant tissues are removed from the growing area and properly disposed, so that the metal-containing tissues are not allowed to reassimilate into the soil. This process can be used in numerous repetitive cycles until the soil is essentially contaminant free.

In some of the preferred embodiments of the invention, techniques might be used to increase the rate of metal uptake in the plants. Such techniques include, but are not limited to, increasing the acidity of or adding chelators to the soil in which the creosote bushes are growing. Wild creosote bushes or bushes planted from commonly available seeds or seedlings may be used.

A second aspect of the invention is directed at methods of recovering metals from contaminated soil. As described above, creosote bushes growing in contaminated soil scavenge the heavy metals and sequester them in their leaves, stems and roots. In embodiments of this aspect of the invention, rather than disposing of the metal-containing leaves and branches after removing them from the bushes, the metals are reextracted from the plant tissues. In a preferred embodiment of the present invention, the metals are extracted from the plant matter by treating dried plant matter with aqueous acid and collecting the resultant metal oxides. Anions can be introduced to solutions of the plant material to form insoluble metal salts that can then be easily collected. Alternatively, the metals can be extracted from the plant matter by numerous other means, including using metal chelators such as ethylenediamine tetraacetic acid (EDTA), diethylenetriaminepentaacetic acid (DTPA), nitrilotriacetic acid, 1,10-phenanthroline, porphyrins, sapphyrins, crown ethers, and cryptands, amongst others. In still further embodiments of the invention, various metal chelators might also be used to selectively separate selected metals from the other metals taken up by the plants. Alternatively, electrolysis or other methods known to one of skill in the art might be used to separate metal ions of one species from another and from the organic plant matter. The preferred metals that can be reclaimed by this methods include lead, copper, cadmium and nickel, with lead and copper being the most preferred.

When used herein, the term "locate" or "locating" may refer either to the action of finding or discovering the location of an article, such as a creosote bush, or the action of establishing or physically placing or causing the placement of an article in a particular location. Thus, "locating creosote bushes on an area of land" indicates either finding creosote bushes growing naturally in a particular location or purposely planting creosote bushes in a particular location. "Locating creosote bushes" may encompass a combination of these two activities. "Planting" creosote bushes may refer to planting seeds or seedlings, transplanting fully or partially grown plants, or any combination of these activities. Planting the seeds, seedlings or plants may be done by hand or with the aid of a machine.

DESCRIPTION OF ILLUSTRATIVE EMBODIMENTS

*Larrea tridentata*, the creosote bush, is the most common desert shrub of the Southwestern United States, native to an area covering roughly twenty million acres from western Texas to California (Audubon Society). The bush is an evergreen, growing from four to eight feet tall with many upright branches. The leaves consist of two stemless leaflets. Each leaflet is crescent shaped, approximately ⅜ inch long. Long used as a decorative shrub, the plant is readily commercially available.

The present invention relates to the inventors' finding that creosote bushes were found naturally growing in the heavy metal-contaminated soil near a copper smelting operation in El Paso, Tex. The metal content of the soil near the operation included copper, lead, cadmium, nickel, arsenic, chromium, barium, selenium and zinc. Comparison of the metal content of the tissues of plants growing in six heavy metal contaminated sites compared with that of the tissues of creosote bushes growing in uncontaminated areas indicates that creosote bushes are able to scavenge heavy metals from the soil (Gardea-Torresdey et al). At the most contaminated site tested, concentrations of lead and copper in the soil were 5,067 mg/kg and 4,933 mg/kg, respectively. The concentration of lead in the creosote bush leaves was 150 mg/kg, the concentration in the stems was 110 mg/kg, and the concentration in the roots was 650 mg/kg. The copper concentrations in the creosote bushes were 493 mg/kg in the leaves, 370 mg/kg in the stems, and 953 mg/kg in the roots. The cadmium and nickel soil concentrations were lower, 117 mg/kg and 17 mg/kg. The cadmium concentrations in the plant tissues were 20 mg/kg in the leaves, 10 mg/kg in the stems, and 30 mg/kg in the roots. Nickel concentrations in all three plant tissues were 10 mg/kg. Concentrations of the highest level metal contaminant, copper, ranged from 500–1,000 mg/kg soil at four of the other five contaminated sites, translating to a metal content in creosote bush leaves from between 100 to 250 mg/kg. The contaminated soils being remediated may contain 50 to 50,000 mg lead or copper per kilogram, 0.2 to 200 mg nickel per kilogram, and/or 1.2 to 1,200 mg cadmium per kilogram.

Unlike most metal-scavenging plants, which contain most of their scavenged metal in their roots, the creosote bushes contained a substantial amount of scavenged metal in their stems and leaves. At the most contaminated site, 28% of the lead, 47% of the copper, 61% of the cadmium, and 55% of the nickel recovered in creosote tissues were extracted from the stems and leaves (based upon the soil concentrations mentioned above). This means that removing the entire plant is not necessary when using creosote bush phytoremediation. Collection and removal of the leaves and stems or of the leaves alone will reduce and should ultimately eliminate heavy metals from the contaminated soil. The creosote roots or the roots and stems can be left to continue removing more heavy metals from the soil while growing more leaves. Indeed, creosote plants can be left growing in an area for many years until the area is decontaminated, with some plant tissues, either the leaves and a portion of the stems or just the leaves alone, being periodically removed from the contaminated area before those plant tissues are allowed to become incorporated into the soil, recontaminating it. As will be obvious to those in the field, in some cases it might be desirable for the uptake of the metal into the creosote bushes to be hastened by fertilizing the soil, acidifying the soil or adding chelators to the soil (Kumar et al.; Brown).

The leaves and stems of the creosote plants can be removed in a variety of ways. The leaves may be removed from the stems while they are still on the plants, or the leaves may be collected from the ground surrounding the plants after they have fallen from the bushes naturally or been caused to fall off the bushes on purpose, for example, by shaking the bushes. Any of the above activities may be done by hand or by machine. As will be obvious to one of skill in the art, the number of creosote bushes that may be planted in a given area will depend on the method of plant tissue collection, as well as the physical needs of the plants for water and soil nutrients and the like. The correct time for collecting the plant tissues will depend on the plant's growing cycle and those factors that influence that cycle, such as the weather, fertilizers, and the water supply. In general, it will be desired that the leaves are at least partially harvested once or twice a year. The amount of stem tissue that might be collected will depend on the maturity of the plant, the method of collection and the desired rate of soil decontamination.

Qualitative x-ray microfluorescence studies indicated that an even wider variety of heavy metals, including mercury, strontium, selenium, and arsenic for example, may be accumulated by creosote tissues. Such results indicate that creosote bushes may well be useful in the decontamination of land subjected to radioactive wastes or emissions from radioactive accidents.

Disposal methods for the harvested, metal-contaminated plant tissues will also vary depending on cost, availability and the intent of the individual. The tissues may be buried at an appropriate land fill or held in a containment enclosure of some sort so that the metals can not leach back into the environment. The tissues may be incinerated and the residue buried. In several of the preferred embodiments of the invention, particularly when the plant matter contains more valuable metals, the metal can be recovered from the plant matter. Several methods for recovering or extracting the metal from the plant tissue will involve drying the plant tissue. This can be done naturally or the process can be expedited by heating the tissue, for example, in an oven at an elevated temperature, preferably of between 40° C. and 500° C. The dried plant matter can then be pulverized to a powder so that it can be easily handled.

As will be apparent to one of skill in the art, there are a number of ways to extract the metal from the plant matter. One simple method of extracting the metals from the plant tissue is acid digestion, for instance, by refluxing the plant tissue with nitrous acid or aqua regia, followed by collection of the resultant metal oxides. Such oxides are useful for, amongst other things, determining the plant metal content by flame atomic absorption analysis.

Alternatively, the metal ions can be separated from the organic plant matter through the use of various metal chelators, including various polyamine compounds such as ethylenediaminetetraacetic acid (EDTA) diethylenetriaminetetraacetic acid (DTPA) bipyridine, nitrilotriacetic acid, ethyleneglycol-bis-($\beta$-aminoethylether)-N,N-tetraacetic acid, and 1,10 phenanthroline; cyclic polyamine chelator compounds such as azacrown compounds, porphyrins, sapphyrins, and rubyrins; polyethers such as a crown ethers, cyclodextrans, catecholate and cyclophanes; or any suitable naturally occurring or chemically synthesized polycarboxylate ionophore. Such chelator compounds may be attached to a solid support, such as silica gel or glass, SEPHAROSE, polyacrylamide, or polystyrene beads and the like, to make the extraction process more facile. The use of chelators that preferentially bind one metal ion over another would provide a method of separating the metals from each another. Electrolysis or other ore refining techniques can also be used to purify the metal, or the metal ions can be precipitated from a solution of the plant matter with a variety of anions as their metal salts. Further methods will be obvious to one of skill in the art. These methods can be used alone or may be used in combination with one another.

The present invention includes creosote bush tissue separated from such bushes located and grown on heavy metal-contaminated land. The separated tissue is an enriched source of heavy metal contaminants, particularly where such metal contaminants have a commercial value.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Phytoremediation with Creosote Bushes
Preparation of *Larrea tyidentata* and soils Samples of creosote bushes (all approximately 3 feet tall and at the same level of maturity) and their surrounding soil were oven dried at a temperature of 90° C. for four days. This mild temperature was chosen to avoid vapor loss of the metals or of their salts. After drying, the leaves, roots, and stems were separated and ground. Soils were also sieved through −100 Tyler mesh material to remove unwanted rock and sediment materials from the matrix. After the tissues were obtained, three replicate one gram samples of each tissue were acid-digested according to EPA method 3050 with the exception that no hydrochloric acid was used (United States EPA). A fourth replicate sample was also prepared and digested but was spiked with either 1.0 or 5.0 ppm each of copper, lead, cadmium, and nickel, which were the metals of interest. A control sample was also prepared to ensure the integrity of the analytical procedure. The EPA protocol that was adopted for the acid digestion of the soil and tissue samples here can be described as follows: A 1.00–2.00 gram homogenous representative sample was obtained and placed in conical beakers. A slurry of the sample was prepared by adding 10 ml of 1:1 nitric acid ($HNO_3$). The slurry was then covered with a watch glass, heated to near boiling, and refluxed for 15 min. After refluxing, the slurry was cooled and then 5 ml of concentrated $HNO_3$ was added, and the solution was again allowed to reflux for an additional 30 min. This last step was repeated to ensure complete oxidation of the metals. After the third refluxing period, the sample was cooled to room temperature and 2 ml of deionized water and up to 10 ml of 30% hydrogen peroxide were added. The sample was then filtered to remove any particulates which might interfere with FAA analysis. The filtrate was collected in a 100 ml volumetric flask and diluted with deionized water to volume. The sample, which was approximately 5.0% (v/v) nitric acid, was now ready for FAA analysis.

Flame Atomic Absorption Analysis of Metals taken up by *Larrea tridentata*

Analysis for the metals of interest was performed using a Perkin Elmer model 3110 atomic absorption spectrometer with deuterium background subtraction. Impact bead was utilized to improve the sensitivity. Wavelengths used for the FAA analysis of copper, lead, cadmium, and nickel were 327.4 nm, 283.3 nm, 228.8 nm, and 352.5 nm, respectively. Samples were read three times, and a mean value and a relative standard deviation were computed. Calibrations were performed in the range of analysis, and a correlation coefficient for the calibration curve of 0.98 or greater was obtained. The instrument response was periodically checked with known standards. Confidence intervals of 95% were calculated for each set of samples to determine the error margin.

EXAMPLE 2

X-Ray Microfluorescence Assays

Qualitative data on creosote accumulation of metals from bushes growing on heavy metal contaminated land was obtained by x-ray microfluorescence (XRMF). A Kevex Omicron XRMF spectrometer obtained from Fisons Instruments was utilized. X-ray spectrograms of roots and leaves from creosote bushes grown on contaminated land were obtained. In the roots, the presence of manganese, iron, nickel, copper, zinc, asbestos, led, selenium, and strontium (among other metals) was observed. The presence of mercury was also noted. The same elements were observed but at lower intensities, in x-ray microfluorescence studies of creosote leaves from the same contaminated site. These preliminary studies indicate the potential for creosote remediation of land contaminated with an even wider variety of heavy metals.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

The Audubon Society Nature Guides, *Deserts*, Alfred A. Knopf, Inc., New York, 1992, p. 499.

Baker, Brooks and Reeves, *New Sci.*, 1603:44–48, 1989.

Baker, McGrath, Sidoli and Reeves, *Resour. Conserv. Recycl.*, 11:41–49, 1994.

Banuelos and Meek, *J. Environ. Qual.*, 19:772–777, 1990.

Brooks, Trow, Veillon and Jaffre, *Taxon*, 30:420–423, 1981.

Brooks, Morrison, Reeves, and Malaisse, *Plant Soil*, 50:503–507, 1978.

Brooks, Morrison, Reeves, Dudley, and Akrnan, *Proc. R. Soc. London Ser. B*, 203:387–403, 1979

Brown, *BioScience*, 45:579–582, 1995.

Brown, Chaney, Angle and Baker, *J. Environ Qual.*, 23:1151–1157, 1994.

Chaney, in *Land Treatment of Hazardous Wastes*; Parr and Marsh, Eds.; Noyes Data Corp., Park Ridge, 1983; pp50–76.

Cunningham and Berti, *In Vitro Dell Dev. Biol.* 29P:207–212, 1993.

Gardea-Torresdey, Arteaga, Tiemann, Bibb and Gonzales, *HSRC/WERC Joint Conference on the Environment Abstracts*, 1996, p. 93.

Kabata-Pendias and Pendias, *Trace elements in soils and plants*, CRC Press, Boca Raton, 1989.

Koeppe, In *Effect of Heavy Metal Pollution on Plants*, Lepp, Ed., Applied Science Publishers: London, 1981, pp 55–76.

Kumar, Dushenkov, Motto and Raskin, *Environ. Sci. Technol.*, 29:1232–1238, 1995.

Malone, Koeppe, Miller, *J. Plant Physiol.*, 53:388–394, 1974.

Moffat, *Science*, 261:302–303, 1995.

Powell, *Scientific American*, August 1995, 36–37.

Raskin, Kumar, Dushenkov, and Salt, *Curr. Opin. Biotechnol.*, 5:285–290, 1994.

Reeves and Brooks, *Environ. Pollut. Ser A*, 31:277–285, 1983.

United States EPA, Test Methods for the Evaluation of Solid Wastes, Method 3050, Acid Digestion of Sediments, Sludges and Soils, Revision 1, December 1987.

Wenzel, Sattler, and Jockwer, *Agronomy Abstracts*; American Society of Agronomy: Madison, 1993, p. 52.

Zimdahl and Koeppe, in *Effect of Heavy Metal Pollution on Plants*; Boggess, Ed., National Science Foundation: Washington, 1977, pp 99–104.

What is claimed is:

1. A method of decontaminating soil, comprising the steps of:
   a) locating creosote bushes on an area of land containing soil contaminated with at least one heavy metal; and
   b) collecting and removing metal-containing creosote tissues at appropriate time intervals.

2. The method of claim 1 wherein the metal is lead, copper, nickel, cadmium, mercury, arsenic, selenium, strontium or zinc.

3. The method of claim 1 wherein the metal is lead.

4. The method of claim 1 wherein the metal is copper.

5. The method of claim 1 wherein the metal is cadmium.

6. The method of claim 1 wherein the metal is nickel.

7. The method of claim 1 wherein the metal is selenium.

8. The method of claim 1 wherein the metal is arsenic.

9. The method of claim 1 wherein the metal is strontium.

10. The method of claim 1 wherein the metal is mercury.

11. The method of claim 1 wherein the creosote tissues consist of the leaves of the creosote bushes.

12. The method of claim 1 wherein the creosote tissues are collected annually.

13. The method of claim 1 wherein the creosote tissues consist of the leaves and a portion of the stems of the creosote bushes.

14. The method of claim 1 wherein the creosote tissues are leaves and are collected by removing them from branches of the creosote bushes.

15. The method of claim 1 wherein the creosote tissues are leaves and are collected from ground around the creosote bushes.

16. The method of claim 1 wherein the soil of the contaminated land area contains between 50 mg/kg and 50,000 mg/kg of lead.

17. The method of claim 1 wherein the soil of the contaminated land area contains between 50 mg/kg and 50,000 mg/kg of copper.

18. The method of claim 1 wherein the soil of the contaminated land area contains between 0.2 mg/kg and 200 mg/kg of nickel.

19. The method of claim 1 wherein the soil of the contaminated land area contains between 1.2 mg/kg and 1,200 mg/kg of cadmium.

20. A method of decontaminating soil, comprising the steps of:
   a) planting creosote bushes on an area of land containing soil contaminated with heavy metals; and
   b) collecting and removing suitable metal-containing creosote tissues at time intervals.

21. The method of claim 20 wherein the metal is lead, copper, cadmium, nickel, mercury, arsenic, selenium strontium or zinc.

22. The method of claim 20 wherein the metal is lead.

23. The method of claim 20 wherein the metal is copper.

24. The method of claim 20 wherein the metal is cadmium.

25. The method of claim 20 wherein the metal is nickel.

26. The method of claim 20 wherein the creosote tissues consist of the leaves of the creosote bushes.

27. The method of claim 20 wherein the creosote tissues are collected at least annually.

28. The method of claim 20 wherein the creosote tissues consist of the leaves and a portion of the stems of the creosote bushes.

29. The method of claim 20 wherein the creosote tissues are leaves and are collected by removal from branches of the creosote bushes.

30. The method of claim 20 wherein the creosote tissues are leaves and are collected from ground around the creosote bushes.

31. The method of claim 20 wherein the soil of the contaminated land area contains between 50 mg/kg and 50,000 mg/kg of lead.

32. The method of claim 20 wherein the soil of the contaminated land area contains between 50 mg/kg and 50,000 mg/kg of copper.

33. The method of claim 20 wherein the soil of the contaminated land area contains between 0.2 mg/kg and 200 mg/kg of nickel.

34. The method of claim 20 wherein the soil of the contaminated land area contains between 1.2 mg/kg and 1,200 mg/kg of cadmium.

35. A method of recovering heavy metals from soil, comprising the steps of:

a) locating creosote bushes on an area of land containing soil contaminated with at least one heavy metal;

b) collecting and removing suitable metal-containing creosote tissues at time intervals; and c) extracting the metals from the plant tissues.

36. The method of claim 35 wherein the metal is lead, copper, nickel, cadmium or zinc.

37. The method of claim 35 wherein the creosote bushes are planted on the area of land contaminated with at least one heavy metal.

38. The method of claim 35 wherein extracting the metals from the plant tissues is accomplished by acid oxidation of the metals and collection of the metal oxides.

39. The method of claim 35 wherein the heavy metal is lead.

40. The method of claim 35 wherein the heavy metal is copper.

41. The method of claim 35 wherein the heavy metal is nickel.

42. The method of claim 35 wherein the heavy metal is cadmium.

* * * * *